US010434715B2

(12) United States Patent
Umetani et al.

(10) Patent No.: US 10,434,715 B2
(45) Date of Patent: *Oct. 8, 2019

(54) TECHNIQUES FOR PERFORMING CROSS-SECTIONAL STRESS ANALYSIS FOR THREE-DIMENSIONAL OBJECTS

(71) Applicant: AUTODESK, INC., San Rafael, CA (US)

(72) Inventors: Nobuyuki Umetani, Zurich (CH); Ryan Michael Schmidt, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 1252 days.

This patent is subject to a terminal disclaimer.

(21) Appl. No.: 14/544,156

(22) Filed: Dec. 2, 2014

(65) Prior Publication Data
US 2015/0154320 A1 Jun. 4, 2015

Related U.S. Application Data

(60) Provisional application No. 61/911,311, filed on Dec. 3, 2013.

(51) Int. Cl.
G06F 19/00 (2018.01)
B29C 64/386 (2017.01)
(Continued)

(52) U.S. Cl.
CPC .......... *B29C 64/386* (2017.08); *B29C 64/40* (2017.08); *G05B 19/4099* (2013.01); *B33Y 50/02* (2014.12);
(Continued)

(58) Field of Classification Search
CPC .................................................. B29C 67/0092
(Continued)

(56) References Cited

U.S. PATENT DOCUMENTS 9,925,725 B2 * 3/2018 Batchelder ............. B33Y 10/00
2010/0071222 A1 * 3/2010 Solomon ................ G01B 5/207
33/556
(Continued)

FOREIGN PATENT DOCUMENTS

JP 2004110793 A * 4/2004

OTHER PUBLICATIONS

Botsch, et al., "PriMo: Coupled Prisms for Intuitive Surface Modeling", In Proc. of the 4th Eurographics Symposium on Geometry Processing, 2006, 10 pages.
(Continued)

*Primary Examiner* — Evral E Bodden
(74) *Attorney, Agent, or Firm* — Artegis Law Group, LLP

(57) ABSTRACT

In one embodiment of the present invention, a stress analysis engine efficiently computes stresses for an arbitrarily shaped three-dimension (3D) model. In operation, the stress analysis engine slices the 3D model into layers of cross-sections. The stress analysis engine then groups the cross-sections into virtual cross-sections. For each virtual cross-section, the stress analysis engine applies bending moment equilibrium-based equations to determine a corresponding structural stress for the 3D model. The efficiency of this stress analysis process enables real-time feedback of stresses to an interactive design tool that facilitates a trial-and-error design process. Using this trial-and-error process reduces the guesswork and/or over-engineering associated with conventional approaches based on finite element methods that are typically too slow for interactive feedback. Consequently, the disclosed cross-sectional stress analysis techniques enable efficient design of 3D models that produce structural robust 3D objects when manufactured by a 3D printer.

20 Claims, 6 Drawing Sheets
(3 of 6 Drawing Sheet(s) Filed in Color)

(51) Int. Cl.
*G05B 19/4099* (2006.01)
*B29C 64/40* (2017.01)
*G06F 17/50* (2006.01)
*B33Y 50/02* (2015.01)

(52) U.S. Cl.
CPC .... *G05B 2219/49038* (2013.01); *G06F 17/50* (2013.01); *G06F 2217/12* (2013.01); *Y02P 90/265* (2015.11)

(58) Field of Classification Search
USPC .......................................................... 700/98
See application file for complete search history.

(56) References Cited

U.S. PATENT DOCUMENTS

| | | | | |
|---|---|---|---|---|
| 2012/0078599 | A1* | 3/2012 | Tryon, III | G06F 17/5018 703/7 |
| 2014/0086780 | A1* | 3/2014 | Miller | A61F 5/01 419/1 |
| 2015/0377766 | A1* | 12/2015 | Kadau | G01L 1/00 702/35 |

OTHER PUBLICATIONS

Gibson et al., "Additive Manufacturing Technologies: Rapid Protyping to Direct Digital Manufacturing", 1st ed. Springer Publishing, Inc., 2009, 30 pages.

Luo, et al., "Chopper: partitioning models into 3D-printable parts", ACM Transactions on Graphics, vol. 31, Issue 6, Nov. 2012, pp. 129:1-129:9.

Miklos et al., "Discrete Scale Axis Representations for 3D Geometry", ACM Transactions on Graphics, vol. 29, Issue 4, Jul. 2010, pp. 101:1-101:10.

Panozzo, et al., "Designing unreinforced masonry models", ACM Transactions on Graphics, vol. 32, Issue 4, Jul. 2013, pp. 91:1-91:12.

Prevost, et al., "Make it stand:balancing shapes for 3d fabrication", ACM Transactions on Graphics, vol. 32, Issue 4 Jul. 2013, pp. 81:1-81:10.

Schmidt et al., "MeshMixer: An Interface for Rapid Mesh Composition", ACM SIGGRAPH 2010 Talks, Jul. 2010.

Stava, et al., "Stress Relief: Improving Structural Strength of 3D Printable Objects", ACM Transactions on Graphics, vol. 31, Issue 4, Jul. 2012, pp. 48:1-48:11.

Timoshenko, et al., "Theory of Elasticity", 3rd Ed., Mcgraw-Hill College, 6, 1970.

Umetani, et al., "Guided exploration of physically valid shapes for furniture design", ACM Transactions on Graphics, vol. 31, Issue 4, Jul. 2012, pp. 86:1-86:11.

Whiting, et al., "Structural optimization of 3D masonry buildings", ACM Transactions on Graphics, vol. 31, Issue 6 Nov. 2012, pp. 159:1-159:11.

Zhou, et al., "Worst-case structural analysis", ACM Transactions on Graphics, vol. 32, Issue 4, Jul. 2013, pp. 137:1-137:12.

* cited by examiner

FIGURE 4

TECHNIQUES FOR PERFORMING CROSS-SECTIONAL STRESS ANALYSIS FOR THREE-DIMENSIONAL OBJECTS

CROSS-REFERENCE TO RELATED APPLICATIONS

This application claims benefit of the U.S. Provisional Patent Application having Ser. No. 61/911,311, filed on Dec. 3, 2013, which is hereby incorporated herein by reference.

BACKGROUND OF THE INVENTION

Field of the Invention

Embodiments of the present invention relate generally to computer science and, more specifically, to techniques for performing cross-sectional stress analysis for three-dimensional objects.

Description of the Related Art

Democratized digital manufacturing devices, such as desktop three-dimensional (3D) printers, enable non-professional users to casually create physical objects based on 3D printable digital models. To streamline the creation and optimization of 3D models, various interactive modeling tools provide users with intuitive modeling interfaces. Such tools often include graphical user interfaces (GUIs) that convey useful visual feedback during portions of the design process. For example, users may use a sculpting brush in conjunction with real-time visualization of a 3D model to interactively edit the 3D model to address a highlighted concern such as overhanging regions that stress the capabilities of the 3D printer.

However, some design issues that arise when developing a 3D model are inadequately determined and/or displayed using conventional modeling tools, increasing the likelihood of users creating 3D objects that exhibit undesirable characteristics or design flaws. In particular, conventional modeling tools typically do not include user-friendly, real-time interfaces for structural stress analysis and, as a result, novice users often create 3D objects that are fragile and prone to breakage.

In one approach to performing structural stress analysis, finite element analysis implemented through finite analysis methods (FEMs) is used to evaluate the structural validity of 3D models. While FEMs may reliably provide insights into critical stress points, FEMs involve time-consuming 3D mesh generation and the solution of large linear systems—rendering .FEMs unsuitable for real-time modeling and visualization. Commonly, the complexity and time-consuming nature of FEMs leads to one of two undesirable outcomes. Some users unsuccessfully guess the location of critical stress and fail points, generating 3D objects that are structurally unsound. Other users over-engineer the 3D model, ensuring the structural integrity of the corresponding 3D object, but introducing unnecessary complexity and/or material, thereby increasing the time and cost required to manufacture the 3D object.

As the foregoing illustrates, what is needed in the art are more effective techniques for performing structural stress analysis when developing 3D models.

SUMMARY OF THE INVENTION

One embodiment of the present invention sets forth a computer-implemented method for performing a structural stress analysis for a three-dimensional model of an object. The method includes slicing the three-dimensional model to produce one or more layers of two-dimensional cross-sections, grouping multiple disjoint two-dimensional cross sections included in a first layer into a first virtual cross-section based on the connectivity of the three-dimensional model; and computing a structural stress associated with the first virtual cross-section based on bending moment equilibrium.

One advantage of the disclosed cross-sectional structural analysis techniques is that these techniques automatically and efficiently detect critical stress for an arbitrary 3D model. Unlike FEM, cross-sectional structural analysis may be performed real-time and feedback from the analysis may be leveraged to facilitate trial-and-error design processes that reduce guesswork and/or over engineering. In particular, employing the disclosed cross-sectional stress analysis techniques enables efficient design of robust 3D models for 3D printing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The patent or application file contains at least one drawing executed in color. Copies of this patent or patent application publication with color drawing(s) will be provided by the Office upon request and payment of the necessary fee.

FIG. 4 depicts various heuristics implemented within the stress analysis engine of FIG. 1 according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
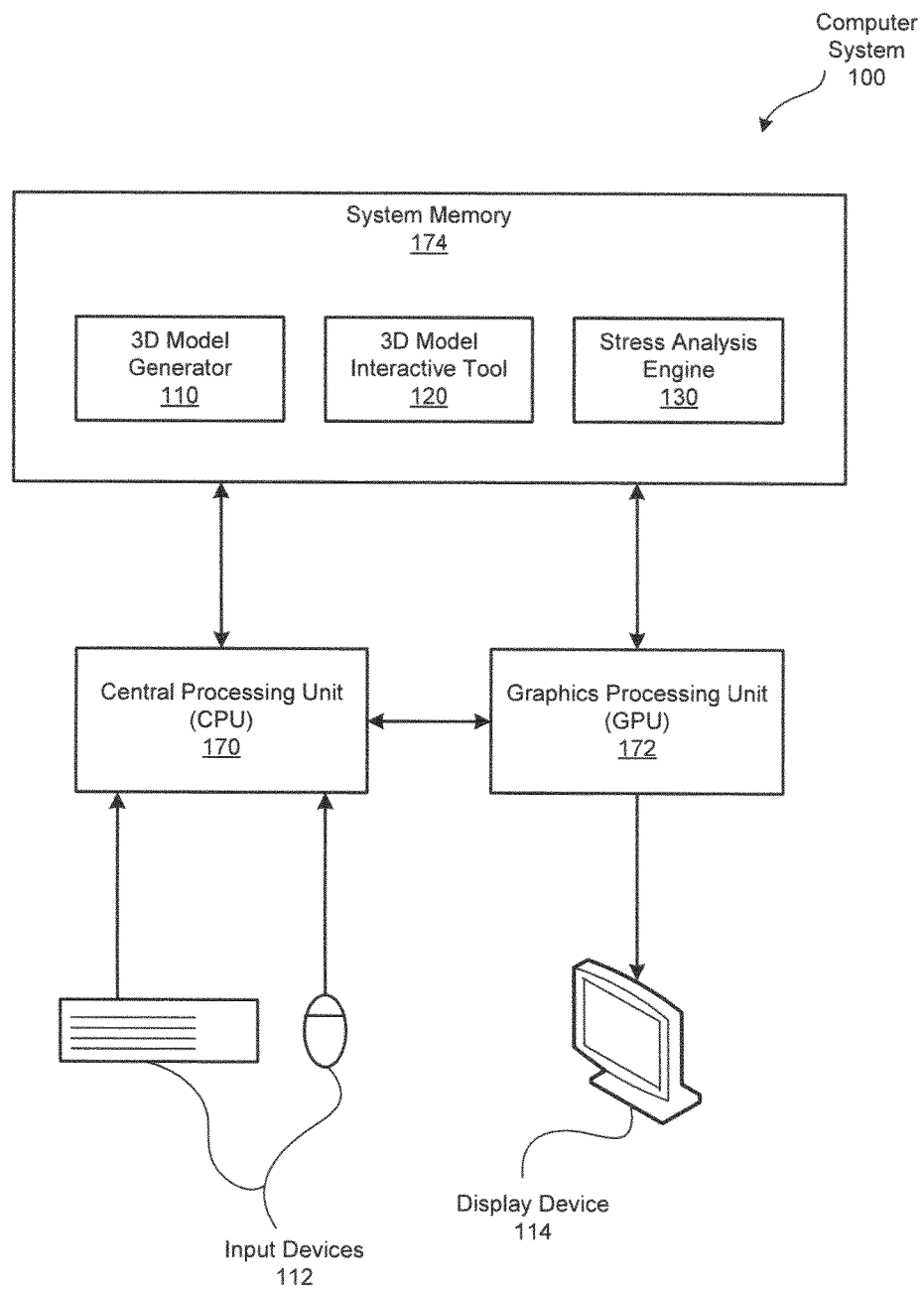
FIG. 1 is a block diagram illustrating a computer system configured to implement one or more aspects of the present invention.

FIG. 1 is a block diagram illustrating a computer system 100 configured to implement one or more aspects of the present invention. As shown, the computer system 100 includes, without limitation, a central processing unit (CPU) 170, a system memory 174, a graphics processing unit (GPU) 172, input devices 112, and a display device 114.

The CPU 170 receives input user information from the input devices 112, such as a keyboard or a mouse. In operation, the CPU 170 is the master processor of the computer system 100, controlling and coordinating operations of other system components. In particular, the CPU 170 issues commands that control the operation of the GPU 172. The GPU 172 incorporates circuitry optimized for graphics and video processing, including, for example, video output circuitry. The GPU 172 delivers pixels to the display device 114 that may be any conventional cathode ray tube, liquid crystal display, light-emitting diode display, or the like. In various embodiments, GPU 172 may be integrated with one or more of other elements of FIG. 1 to form a single system. For example, the GPU 172 may be integrated with the CPU 170 and other connection circuitry on a single chip to form a system on chip (SoC).

The system memory 174 stores content, such as software applications and data, for use by the CPU 170 and the GPU 172. As shown, the system memory 174 includes a 3D model generator 110, a 3D model interactive tool 120, and a stress analysis engine 130. The 3D model generator 110, the 3D model interactive tool 120, and the stress analysis engine 130 are software applications that execute on the CPU 170, the GPU 172, or any combination of the CPU 170 and the GPU 172.

In operation, the 3D model generator 110 enables specification of a 3D model 205 that describes a 3D object. The 3D model generator 110 may be implemented in any technically feasible fashion. For instance, the 3D model generator 110 may include computer aided design (CAD) software. In operation, the 3D model generator 110 enables specification of the 3D model 117. The 3D model describes a desired 3D solid object. The 3D model generator 110 may be implemented in any technically feasible fashion. For instance, the 3D model generator 110 may include computer aided design (CAD) software. Such CAD software often includes a graphical user interface that converts designer input such as symbols and brush stroke operations to geometries in the 3D model. Alternatively the 3D model generator 110 may be a 3D scanner that analyzes an existing 3D solid object to create the 3D model as a digital template for creation of copies of the existing 3D solid object.

The 3D model may conform to any 3D printable format as known in the art. For instance, in some embodiments the 3D model may capture unit normal and vertices that define the 3D solid object in the stereolithograpy format. In alternate embodiments, the 3D model may capture a 3D mesh of interconnected triangles that define the 3D solid object in the collaborative design activity (COLLADA) format. In alternate embodiments, the 3D model is created manually and the 3D model generator 110 is not included in the computer system 100.

The 3D model generator 110 is coupled to the 3D model interactive tool 120. This coupling may be implemented in any technically feasible fashion, such as exporting the 3D model from the 3D model generator 110 and then importing the 3D model to the 3D model interactive tool 120. The 3D model interactive tool 120 is configured to receive designer input information from the input devices 112. After the 3D model interactive tool 120 processes the designer input information in conjunction with the 3D model, the 3D model interactive tool 120 delivers pixels to the display device 114. The 3D model interactive tool 120 is configured to continuously repeat this cycle, enabling the designer to dynamically interact with the 3D model based on real-time images on the display device 110.

The stress analysis engine 130 performs real-time stress analysis for the 3D model based on applying bending moment equilibrium to cross-sections of the 3D model. The stress anaylsis engine 130 provides combinations of virtual cross-sections and maximum stresses to the 3D model interactive tool 120. The 3D model interactive tool 120 then enhances an image of the 3D model 205 on the display device 114 based on these stresses. The 3D model interactive tool 120 may enhance the model in any technically feasible fashion, such as displaying a color map of stresses, where a blue color depicts cross-sections of the model associated with low stress and a red color depicts cross-sections of the model associated with high stress. In alternate embodiments, the stress analysis engine 130 may provide stress analysis data in any format and to any application configured to consume the analysis data.

In some embodiments, the 3D model generator 110, the 3D model interactive tool 120, and the 3D stress analysis engine 130 facilitate 3D printing. In alternate embodiments, the 3D model generator 110, the 3D model interactive tool 120, and/or the 3D stress analysis engine 130 are integrated into any number (including one) of software applications. In other embodiments, the system memory 174 may not include the 3D model generator 110, the 3D model interactive tool 120, and/or the 3D stress analysis engine 130. In some embodiments, the 3D model generator 110, the 3D model interactive tool 120 and/or the stress analysis engine 130 may be provided as an application program (or programs) stored on computer readable media such as a CD-ROM, DVD-ROM, flash memory module, or other tangible storage media.

The components illustrated in the computer system 100 may be included in any type of computer system 100, e.g., desktop computers, server computers, laptop computers, tablet computers, and the like. Additionally, software applications illustrated in computer system 100 may execute on distributed systems communicating over computer networks including local area networks or large, wide area networks, such as the Internet. Notably, the 3D stress analysis engine 130 described herein is not limited to any particular computing system and may be adapted to take advantage of new computing systems as they become available.

It will be appreciated that the computer system 100 shown herein is illustrative and that variations and modifications are possible. The number of CPUs 170, the number of GPUs 172, the number of system memories 174, and the number of applications included in the system memory 174 may be modified as desired. Further, the connection topology between the various units in FIG. 1 may be modified as desired.

Stress Analysis Engine

Figure 2:
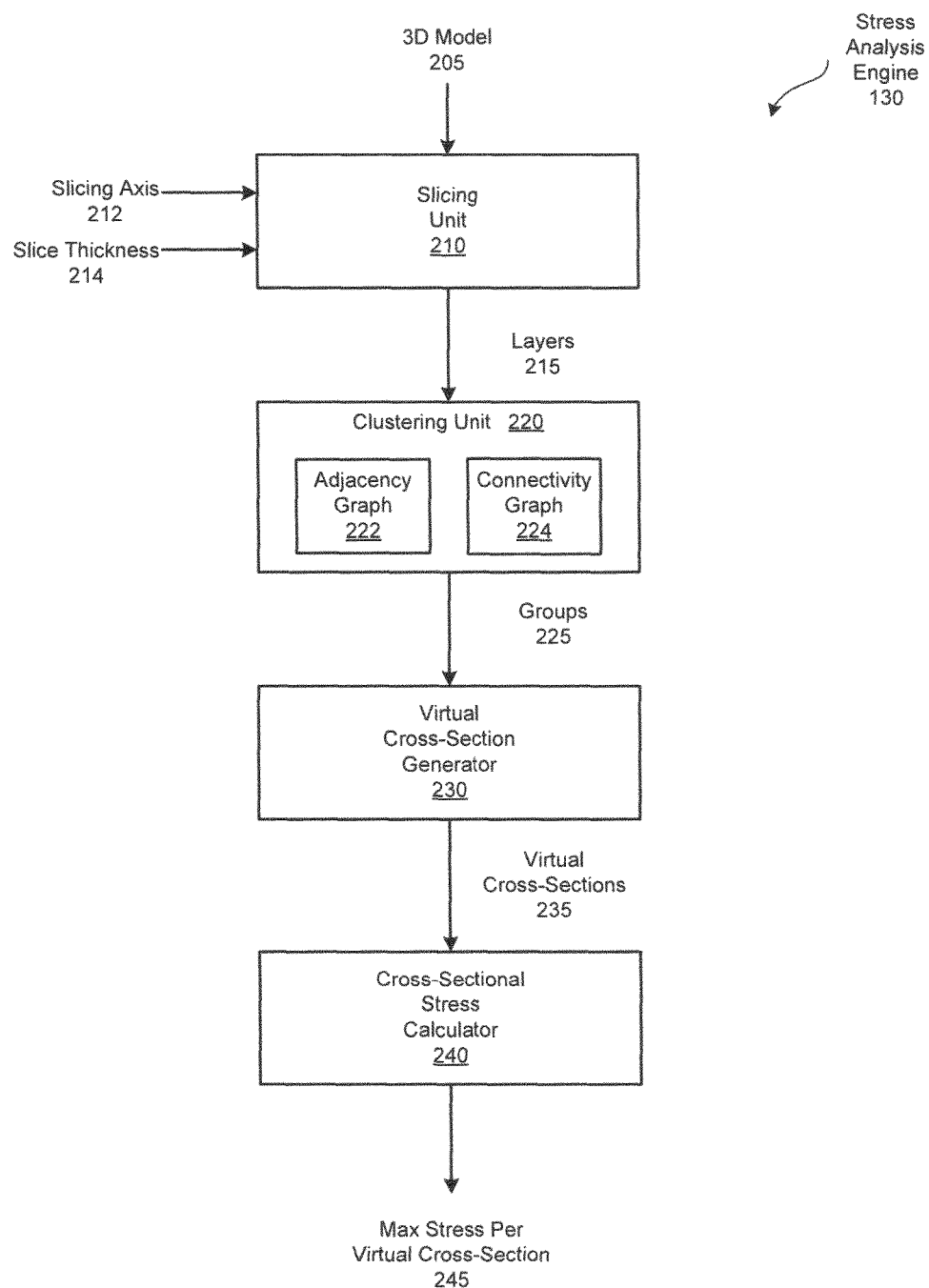
FIG. 2 is a block diagram illustrating the stress analysis engine of FIG. 1, according to embodiments of the present invention.

FIG. 2 is a block diagram illustrating the stress analysis engine 130 of FIG. 1, according to embodiments of the present invention. As shown, the stress analysis engine 130 includes, without limitation, a slicing unit 210, a clustering unit 220, a virtual cross-section generator 230, and a cross-sectional stress calculator 240. As shown in FIG. 1, the stress analysis engine 130 is included in the system memory 174 of the computer system 100 and executes on the CPU 170 and/or the GPU 172.

To perform efficient stress analysis for a 3D model 205, the stress analysis engine 130 is configured to slice the 3D model 250 into layers 215 of cross-sections and then apply bending moment equilibrium-based analysis to these cross-sections. In operation, the slicing unit 210 divides the 3D model 250 into layers 215 of a configurable slice thickness 214 along a configurable slicing axis 212 (direction of the slice). The slice thickness 214 is tunable to accommodate different scenarios—trading off between calculation time and accuracy. For example, to enable real-time feedback, a relatively large thickness may be selected. To obtain more accurate results, a relatively small thickness may be selected.

The slicing axis 212 is a consistent, single direction that may be selected in any technically feasible fashion. In some embodiments, the slicing axis 212 is selected arbitrarily. In other embodiments, any technically feasible heuristic may be employed to select the slicing axis 212. For example, a heuristic based on geometric analysis of the 3D model 205 may select the slicing axis 212 to optimize the stress analysis at a specific location of the 3D model 205. Advantageously, because the slicing unit 210 decomposes the 3D model 350 into planar layers 215, the 3D slicing unit 210 may operate on a wide range of modelling formats. Notably, the stress analysis engine 130 may process arbitrary meshes and computer-aided design boundary representation models. By contrast, the application of FEM to stress analysis is limited to volume meshes.

As outlined previously herein, as part of performing the stress analysis, the stress analysis engine 130 applies bending moment equilibrium to compute stresses for cross-sections. More specifically, embodiments employ the Euler-Bernoulli (EB) assumption, a widely-used engineering model that is traditionally limited to analysis of beam structures. In particular, the techniques disclosed herein extend the application of the EB assumption to cross-sections of free-form 3D objects, enabling efficient and accurate stress analysis for complex 3D models 205.

In general, given an external force, the maximum stress on the cross-section may be computed based on the Euler-Bernoulli (EB) assumption. However, in a complex 3D model 250, there may be multiple disjoint cross-sections in each of the layers 215. As persons skilled in the art will recognize, the distribution of forces depends on the boundary conditions (i.e., where the object is fixed versus where an external force is applied). For this reason, the clustering unit 220 analyzes the cross-sections in included in each layer 215, and distributes the cross-sections into groups 225 of one or more "connected" cross-sections. Conceptually, a user typically holds the larger part of an object when applying a force and the stress on the object is impacted when cross-sections of the object are connected. For example, if a user holds a camel figurine by the body and then pulls the head downwards, the force is distributed across each layer 215 based on the relationship of the cross-sections in the layer 215.

The clustering unit 220 may distribute the cross-sections into groups 225 in any technically feasible fashion. In some embodiments, the clustering unit 220 implements a greedy clustering algorithm. For each layer 215, the clustering unit 220 considers all the cross-sections $\{c_1, c_2, \ldots\}$ included in the layer 215. The clustering unit 220 then greedily clusters these cross-sections into groups 225 $\{g_1, g_2, \ldots\}$ such that cross-sections in the groups 225 divide the object into connected surfaces. More specifically, for each of the groups 225, the clustering unit 220 selects an initial cross-section $c_i$ and then, for the remaining cross-sections $c_j$, determines whether paths from $c_i$ to $c_j$ exist on both sides of the cross-sectional plane (i.e. slicing axis 212). If paths exist on both sides of the cross-sectional plane, then the clustering unit 220 considers the cross-sections to be connected, and clusters $c_j$ into the group 225 that includes $c_i$. The clustering unit 220 iterates, repeating this process until all the cross-sections are distributed into the groups 225 of connected cross-sections, In some embodiments, to expedite the distribution of the cross-sections into the groups 225, the clustering unit 220 first constructs both an adjacency graph 222 and a connectivity graph 224. The adjacency graph 222 represents the connected triangles of the 3D model 205 and the connectivity graph 224 represents the geometric distribution of the cross-sections across the 3D model 205. In operation, the clustering unit 220 employs the adjacency graph 222 to determine whether there is a path of triangles between a selected cross-section and a selected group 225 of cross-sections that lies within the same layer 215, such that the path does not intersect cross-sections outside the selected group 225. If such a path exists, then the clustering unit 220 employs the connectivity graph 224 to determine whether the cross-sections already included in the selected group 222 are accessible from the selected cross-section from both sides of the slicing axis 212. If the selected cross-section is accessible from the selected group 222 from both sides of the slicing axis 212, then the clustering unit 220 adds the selected cross-section to the selected group 222.

As disclosed previously herein, the stress analysis engine 130 is configured to perform cross-sectional stress analysis. Consequently, the virtual cross-section generator 230 processes each of the groups 222 and generates a corresponding virtual cross-section 235. More specifically, for each of the groups 222, the virtual cross-section generator 230 constructs the virtual cross-section 235 and a neutral axis such that the neutral axis is perpendicular to the virtual cross-section 235 and passes through the centroid of the virtual cross-section 235. The virtual cross-section generator 230 may implement any technically feasible algorithm to construct the virtual cross-section 235 and the corresponding neutral axis. In some embodiments, the virtual cross-section generator 230 may use the medial axis to find candidates. In other embodiments, the virtual cross-section generator 230 may employ more efficient techniques, such as one depicted in FIG. 4.

After constructing the virtual cross-sections 235, the cross-sectional stress calculator 240 calculates the max stress per virtual cross-section 245 based on applying the EB assumption independently to each of the virtual cross-sections 235. For the virtual cross-section 235 and corresponding neutral axis direction, the cross-sectional stress calculator 240 determines the external bending moment and the internal bending moment. To achieve moment equilibrium, the virtual cross-section 235 must generate a bending moment which balances out this external bending moment. Accordingly, the cross-sectional stress calculator 240 considers the moment equilibrium equation, "internal stress"+"external stress"=0, to determine the maximum stress on the virtual cross-section 235. The resulting max stresses per virtual cross-section 245 are consumed by other applications, such as the 3D model interactive tool 120, to convey useful stress-related information in a user-friendly fashion.

In alternate embodiments, the clustering unit 220 and/or the virtual cross-section generator 230 and associated functionality may be omitted. For instance, some embodiments include the clustering unit 220 and omit the virtual cross-section generator 230. In such embodiments, for each group 225, the user or an alternative tool may create a cross-section and a corresponding neutral axis in any technically feasible fashion, and the cross-sectional analysis calculator 240 receives this pair as input. In other embodiments, the clustering unit 220 and associated functionality is omitted. In such embodiments, the virtual cross-section generator 230 may or may not be omitted.

In general, based on a selected cross-section 235, a desired force position, and a force direction, the cross-sectional stress calculator 240 may estimate the stress for the 3D model 205 in a purely geometric fashion, without considering material parameters. In some embodiments, the cross-sectional stress calculator 240 is configured to determine the weakest cross-section (i.e., the cross-section with the maximum stress) associated with applying a user-specified force at a user-specified point included in the 3D model 205.

Figure 3:
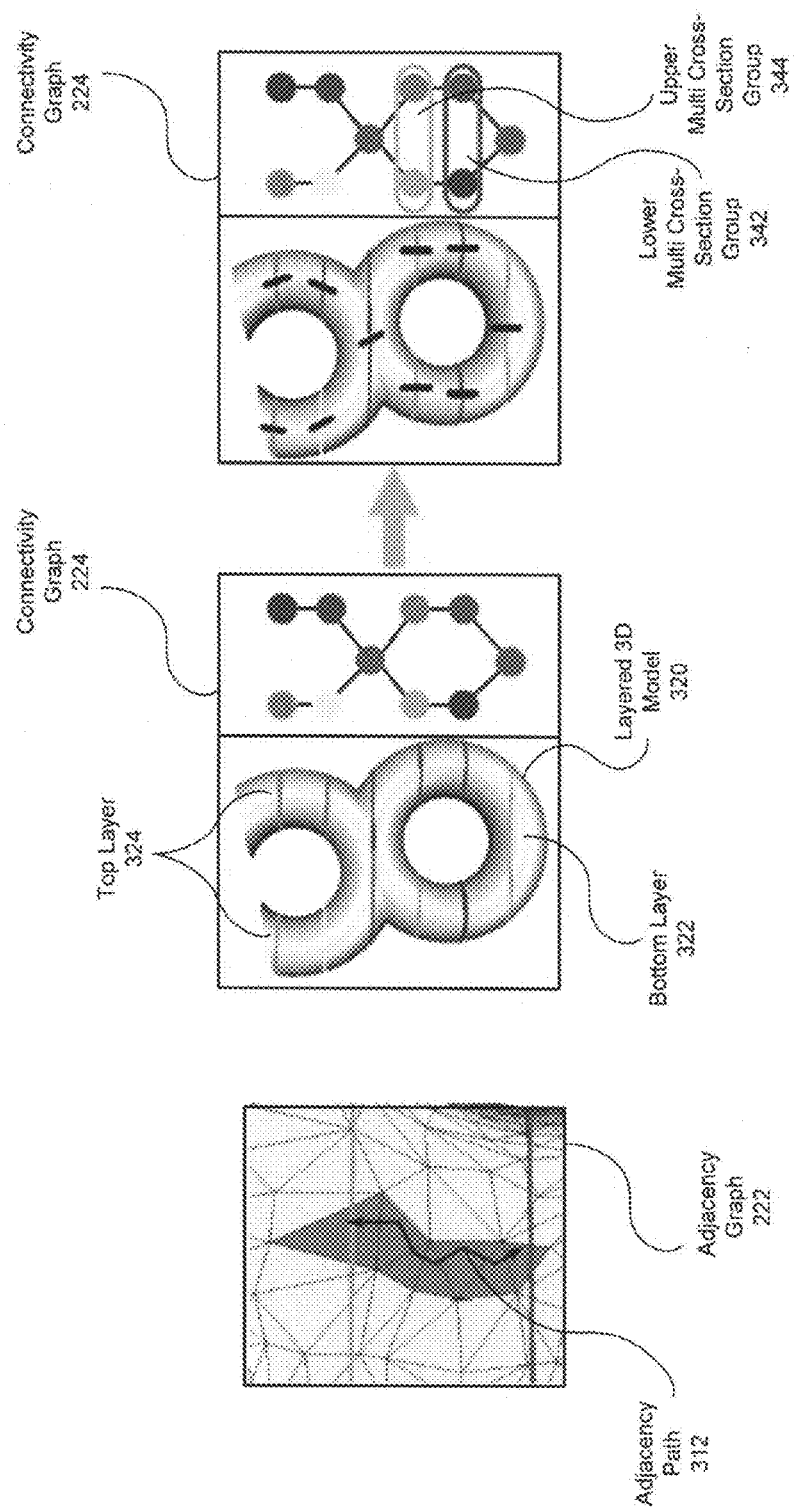
FIG. 3 is a conceptual illustration of the adjacency graph and the connectivity graph constructed by the clustering unit of FIG. 2, according to one embodiment of the present invention.

FIG. 3 is a conceptual illustration of the adjacency graph 222 and the connectivity graph 224 constructed by the clustering unit 220 of FIG. 2, according to one embodiment of the present invention. For explanatory purposes, the clustering unit 220 constructs the adjacency graph 222 and the connectivity graph 224 for cross-sections included in the 3D model 205 of a truncated FIG. 8.

As shown, the truncated FIG. 8 includes both a contiguous circle (lower part of the FIG. 8) and a u-shaped section (upper part of the FIG. 8). A layered 3D model 320 illustrates the layers 215 of the truncated FIG. 8 that the slicing unit 210 creates. In particular, a bottom layer 322 includes a portion at the bottom of the contiguous circle, and a top layer 324 includes a portion at the top of the u-shaped section.

In operation, the clustering unit 220 constructs the adjacency graph 222 and the connectivity graph 224 based on the entire truncated FIG. 8 and then leverages these graphs to efficiently perform greedy clustering on the cross-sections. For each layer 225, the clustering unit 220 determines adjacency paths 312 of connected triangles between a selected cross-section and a cross-section included in a selected group 225 based on the adjacency graph. The clustering unit 220 then evaluates each of these adjacency paths 312 in conjunction with the connectivity graph 224. If the connectivity graph 224 indicates that the cross-section and the group 225 are accessible from both sides of the slicing axis 212, then the clustering unit 220 adds the selected cross-section to the selected group 225.

As annotated in the right-most connectivity graph 224, the clustering unit 220 creates six groups that include a single cross-section 225, and two groups 225 that include two cross-sections. Each of a lower multi cross-section group 342 and an upper multi cross-section group 344 include two discontinuous cross-sections that extend across layers 205 that are encompassed within the contiguous circle portion of the truncated FIG. 8.

Figure 4:
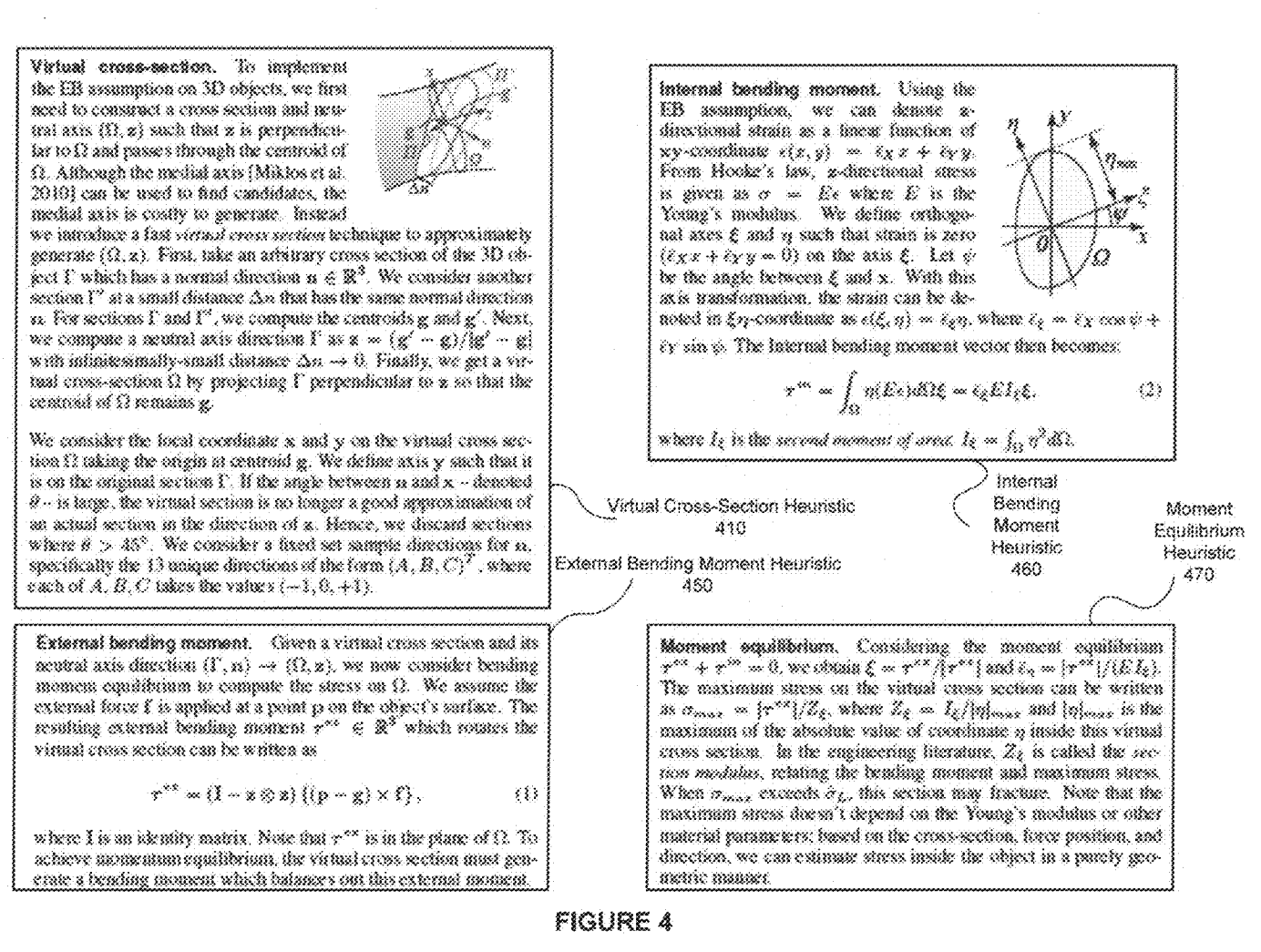

FIG. 4 depicts various heuristics implemented within the stress analysis engine 130 of FIG. 1, according to one embodiment of the present invention. More specifically, the virtual cross-section generator 230 implements a virtual cross-section heuristic 410. The cross-sectional stress calculator 240 implements an external bending moment heuristic 450, an internal bending moment heuristic 460, and a moment equilibrium heuristic 470.

The stress analysis techniques described herein are illustrative rather than restrictive, and may be modified to reflect various implementations without departing from the broader spirit and scope of the invention. Embodiments of the current invention include any techniques that enable cross-sectional stress analysis for 3D models 205. Further, the functionality may be distributed in any manner between any number of units. For example, in some embodiments, the functionality of the coupling unit 222 is combined with the functionality of the virtual cross-section generator 230 into a single component within the stress analysis engine 130.

Figure 5:
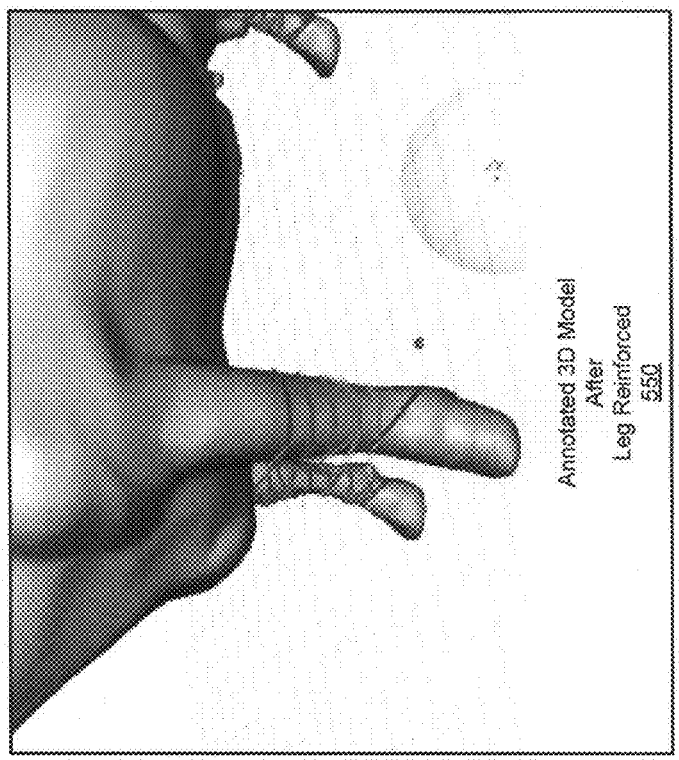
FIG. 5 is a conceptual illustration of the three-dimensional (3D) model of FIG. 2 overlaid with stress-related information before and after a portion of the 3D model is reinforced, according to one embodiment of the present invention.
Figure 5:
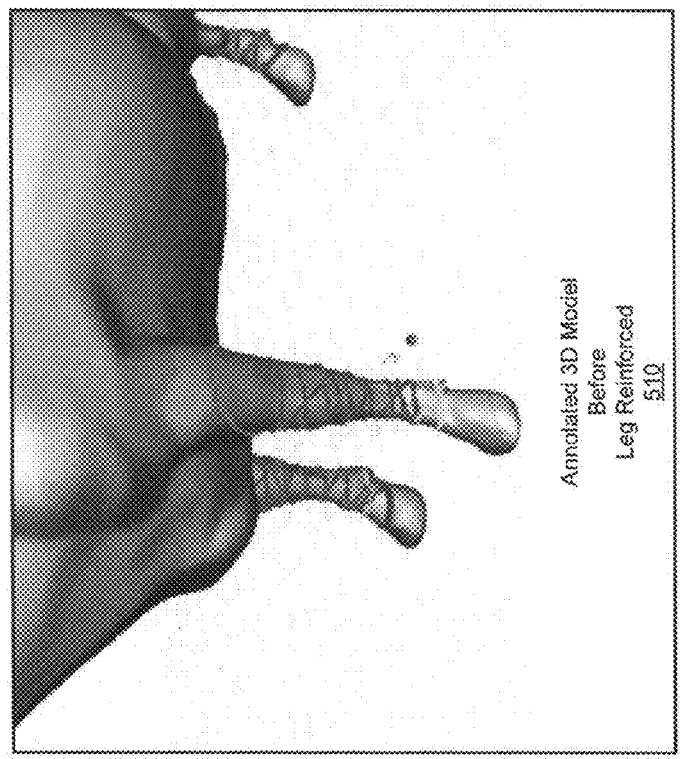

FIG. 5 is a conceptual illustration of the three-dimensional (3D) model 205 of Figure overlaid with stress-related information before and after a portion of the 3D model 205 is reinforced, according to one embodiment of the present invention. The context of FIG. 5 is that a designer is using the 3D model interactive tool 120 to improve the 3D model 205 based on stress analysis data. The 3D model interactive tool 120 and the stress analysis engine 130 are coupled in a manner that is transparent to the designer. However, for discussion purposes, the designer has selected a stress analysis mode that configures the 3D model interactive tool 120 to invoke the stress analysis engine 130 and display the resulting data in real-time.

As shown, an "annotated 3D model before leg reinforced" 510 visually depicts a portion of a cow, with annotations that represent the stress for various virtual cross-sections 235. The annotations depict virtual cross-section with relatively high stress as red and virtual cross-sections with relatively high stress as blue. Initially, the front left leg of the cow includes multiple cross-sections with relatively high stress. Based on the annotated 3D model before leg reinforced 510, the designer invokes a sculpting brush and increases the amount of material included in the front left leg of the cow.

As the designer edits the 3D model 205, the 3D model interactive tool 320 and the stress analysis engine 130 work together to provide real-time visual feedback to enable the design to effectively edit the 3D model 205 without over engineering. As shown in "annotated 3D model after leg reinforced" 550, the reinforcements applied by the designer eliminate virtual cross-sections with relatively high stress from the front leg of the cow.

Without the efficiency exhibited by the stress analysis engine 130, such constructive interactive stress analysis would be prohibitively slow. Notably both FEM and manual methods are unsuitable to such real-time stress analysis for arbitrary 3D models 205. In particular, achieving an acceptable level of accuracy using FEM or manual methods requires unreasonable amounts of time. For example, using the cross-sectional analysis techniques outlined herein, the accuracy correlates to the number of cross-sections evaluated in the 3D model. Typically, the evaluation of hundreds of thousands of cross-sections is required to achieve useful accuracy and, consequently, manual evaluation of the cross-sections is unrealistic.

Figure 6:
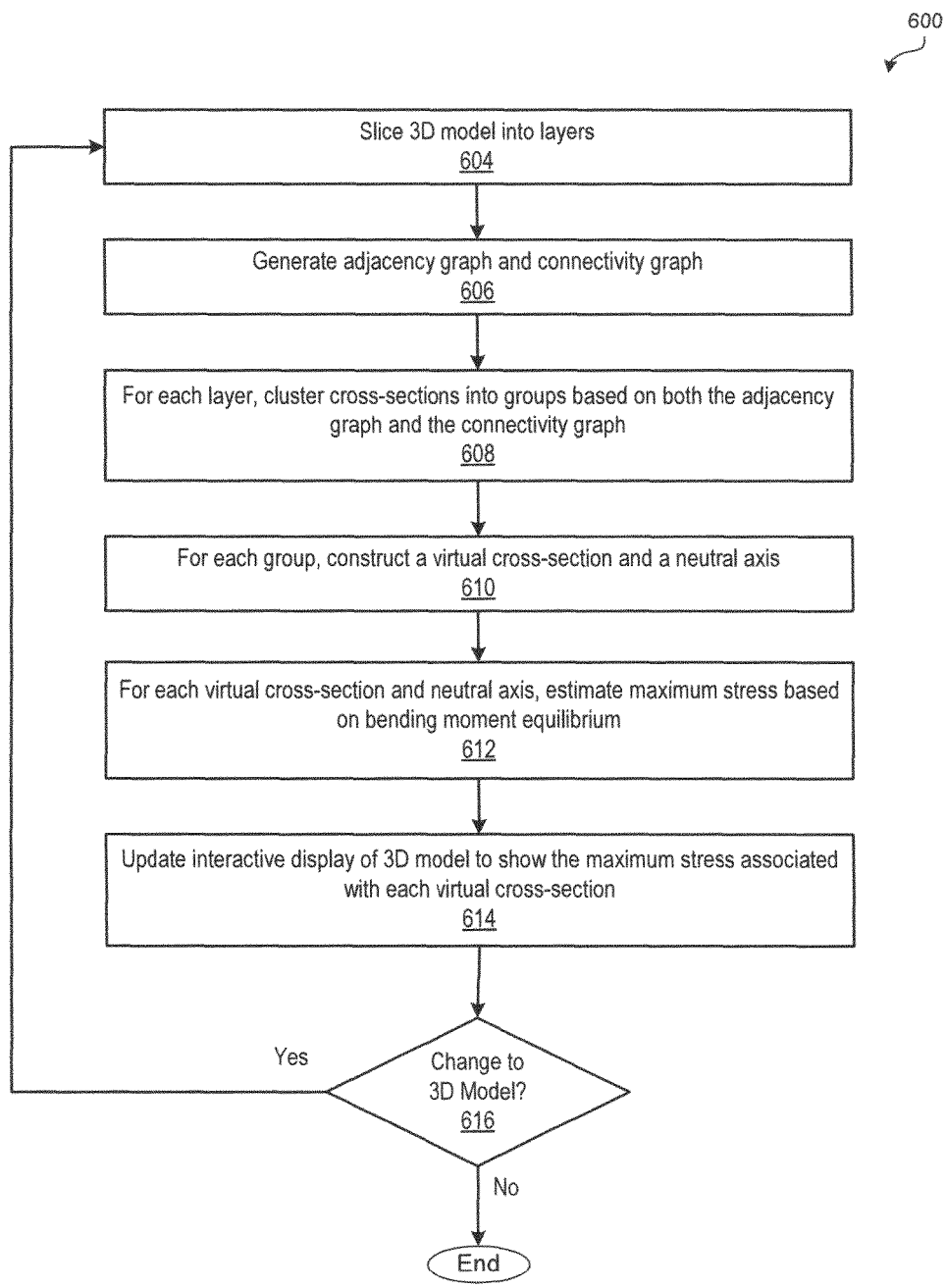
FIG. 6 is a flow diagram of method steps for calculating and displaying structural stresses for a 3D model, according to one embodiment of the present invention.

FIG. 6 is a flow diagram of method steps for calculating and displaying structural stresses for a 3D model, according to one embodiment of the present invention. Although the method steps are described with reference to the systems of FIGS. 1-5, persons skilled in the art will understand that any system configured to implement the method steps, in any order, falls within the scope of the present invention.

As shown, a method 600 begins at step 604, where the stress analysis engine 130 receives the 3D model 205 for evaluation. The slicing unit 240 divides the model into equally spaced layers 215 that are oriented parallel to the slicing axis 212 and are of the slice thickness 214. Advantageously, both the slicing axis 212 and the slicing thickness 214 are configurable, enabling tuning of the stress analysis engine 130 to reflect various constraints and/or tradeoffs, such as computational speed or accuracy of the stress analysis. At step 606, the clustering unit 220 generates the adjacency graphs and the connectivity graph 224 for the 3D model 205. At step 608, for each of the layers 214, the clustering unit 220 allocates cross-sections into groups 225 based on the adjacency graph 222 and the connectivity graph 224. As outlined in detail previously herein, the clustering unit 220 identifies adjacency paths 321 between a selected cross-section and a selected group 225 based on the adjacency graph 222. If the clustering unit 220 identifies adjacency paths 321 that connect the selected cross-section to the selected group 225 across both sides of the slicing axis 212, then the clustering unit 220 adds the selected cross-section to the selected group 225. In this way the clustering unit 220 efficiently identifies groups 225 of disjointed cross-sections that collectively influence the distribution of an external force applied to the three-dimensional object when the three-dimensional object is fixed at a particular location.

In alternate embodiments, the clustering unit 220 may distribute the cross-sections included in each of the layers 215 across the groups 225 in any technically feasible fashion. For example, in some embodiments, the clustering unit 220 generates the groups 224 based on a greedy clustering algorithm that does not rely on the adjacency graph 222 or the connectivity graph 224. In such embodiments, the method 600 omits step 606 and at step 608, the clustering unit 220 performs the alternative clustering algorithm.

At step 610, the virtual cross-section generator 230 constructs the virtual cross-sections 235 and corresponding neutral axes for the groups 225. The virtual cross-section generator 230 may construct the each of the virtual cross-sections 325 in any technically feasible fashion that ensures the neutral axis is perpendicular to the virtual cross-section 235 and passes through the centroid of the virtual cross-section 235. In some embodiments, the virtual cross-section generator 230 implements the virtual cross-section heuristic 410 depicted in FIG. 4.

At step 612, the cross-sectional stress calculator 240 estimates the maximum stress per virtual cross-section 245 based on applying the EB assumption to the combinations of virtual cross-sections 235 and neutral axes. For each virtual cross-section 245, the cross-sectional stress calculator 240 computes the external bending moment and internal bending moment. Subsequently, the cross-sectional stress calculates the maximum stress based on balancing out the external bending moment and the internal bending moment. The virtual cross-section generator 230 may compute the cross-sectional stress based on applying bending moment equilibrium in any technically feasible fashion. For example, in some embodiments, the virtual cross-section generator 230 implements the external bending moment heuristic 450, the internal bending moment heuristic 460, and the moment equilibrium heuristic 470 depicted in FIG. 4.

At step 614, the 3D model interactive tool 120 updates a visualization of the 3D model to display the maximum stresses per virtual cross-section 245. In alternate embodiments, the stress analysis engine 130 may supply cross-sectional stress-related data to any number of components in any format. For example, in some embodiments, the stress analysis engine 130 may perform cross-section stress analysis calculations to determine the impact of applying a specified force at a specified location in the 3D model 205.

At step 616, if the 3D model interactive tool 120 detects a change to the 3D model 205, then the method 600 returns to step 604, where the stress analysis engine 130 processes the updated 3D model 205. The stress analysis engine 130 and the 3D model interactive tool 120 continue to execute steps 604-616, interactively computing the stress if the virtual cross-sections 235 and updating the visualization of the 3D model to depict real-time changes attributable to changes to the 3D model 305. If, at step 616, if the 3D model interactive tool 120 does not detect a change to the 3D model 205, then the method 600 ends.

In sum, the disclosed techniques may be used to efficiently detect critical stress for arbitrarily complex 3D models. In operation, a structural analysis engine slices a 3D model of a 3D object into layers of cross-sections. Notably, each layer may contain multiple disjoint cross-sections and the distribution of forces depends on the boundary conditions (i.e., where the 3D object is fixed and where the external force is applied). To accurately model the relationship between cross-sections in each layer, the structural analysis engine creates both an adjacency graph and a connectivity graph. For each layer, an adjacency path exists wherever two cross-sections are connected by a path of geometries (e.g., triangles) that does not cross other cross-sections. The structural analysis engine then clusters the cross-sections into groups of cross-sections that are connected via adjacency paths on both sides of the slicing axis.

After distributing the cross-sections into groups of one or more cross-sections, the structural analysis engine constructs a per-group virtual cross-section and corresponding neutral axis that are amenable to analysis based on the Euler-Bernoulli assumption (conventionally applied to beams). For each virtual cross-section and corresponding neutral axis direction, the structural analysis engine determines internal bending moments and external bending moments. The structural analysis engine then applies bending moment equilibrium based-techniques to compute the maximum stress on each virtual cross-section. The resulting combinations of virtual cross-sections and maximum stresses may be consumed by other applications, such as an interactive graphical user interface that displays a visualization of the 3D model annotated with areas of critical stress.

Advantageously, this cross-sectional structural analysis technique significantly reduces the time required to detect structural weakness for 3D models compared to conventional, FEM techniques. Notably, cross-sectional structural analysis computations may be incorporated into interactive design tools that enable designers to edit the 3D model based on dynamically updated areas of critical stress. Unlike FEM approaches to structural analysis, this cross-sectional approach is not limited to volume meshes and may be applied to arbitrary meshes or computer-aided design boundary representation models.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing a structural stress analysis for a three-dimensional model of an object, the method comprising:
   slicing the three-dimensional model to produce one or more layers of two-dimensional cross-sections;
   grouping a plurality of disjoint two-dimensional cross sections included in a first layer into a first virtual cross-section based on a connectivity of the three-dimensional model; and
   computing a structural stress associated with the first virtual cross-section based on bending moment equilibrium.

2. The method of claim 1, wherein computing the structural stress comprises applying an Euler-Bernoulli assumption to the first virtual cross-section.

3. The method of claim 1, wherein grouping comprises clustering cross-sections that collectively influence the distribution of an external force applied to the three-dimensional model when the three-dimensional object is fixed at a first location.

4. The method of claim 3, wherein clustering cross-sections comprises:
   constructing an adjacency graph representing the connected triangles of the 3D model and a connectivity graph representing the geometric distribution of the cross-sections across the 3D model;
   assigning a first cross-section included in a first layer to a first group;
   based on the analyzing the adjacency graph in conjunction with the connectivity graph, identifying a second cross-section that is accessible from both sides of the plane of the first layer via paths of triangles that do not cross other cross-sections; and
   adding the second cross-section to the first group.

5. The method of claim 1, wherein computing the structural stress associated with each virtual cross-section comprises:
   selecting a neutral axis based on the plurality of disjoint cross-sections included in the virtual cross-section; and
   applying bending moment equilibrium to the virtual cross-section in conjunction with the neutral axis.

6. The method of claim 1, further comprising identifying a time constraint, and wherein slicing the three-dimensional model comprises:
   selecting a thickness based on the time constraint; and
   partitioning the three-dimensional model at intervals of the selected thickness.

7. The method of claim 1, further comprising:
   grouping a plurality of disjoint two-dimensional cross-sections included in the first layer into a second virtual cross-section based on the connectivity of the three-dimensional model;
   computing a structural stress associated with the second virtual cross-section based on bending moment equilibrium;
   calculating a maximum stress for the three-dimensional model based on the structural stress associated with the first virtual cross-section and the structural stress associated with the second virtual cross-section.

8. The method of claim 1, further comprising:
   computing a structural stress associated with an independent cross-section, wherein the independent cross-section is included in the first layer but is not included in the first virtual cross-section; and
   calculating a maximum stress for the three-dimensional model based on the structural stress associated with the first virtual cross-section and the structural stress associated with the independent cross-section.

9. The method of claim 1, further comprising:
   determining a value corresponding to the computed structural stress associated with the first virtual cross-section;

enhancing an image of the three-dimensional model displayed on a device to reflect the value;

receiving an updated three-dimensional model;

slicing the updated three-dimensional model to produce one or more new layers of two-dimensional cross-sections;

grouping a plurality of disjoint two-dimensional cross sections included in a second layer into a second virtual cross-section based on the connectivity of the updated three-dimensional model;

computing a structural stress associated with the second virtual cross-section based on bending moment equilibrium;

determining a value corresponding to the computed structural stress associated with the second virtual cross-section; and updating the image to reflect the value associated with the second virtual cross-section.

10. One or more non-transitory computer-readable storage media including instructions that, when executed by one or more processing units, cause the one or more processing units to analyze the structural stress for a three-dimensional model of an object by performing the steps of:

slicing the three-dimensional model to produce one or more layers of two-dimensional cross-sections;

grouping a plurality of disjoint two-dimensional cross sections included in a first layer into a first virtual cross-section based on a connectivity of the three-dimensional model; and computing a structural stress associated with the first virtual cross-section based on bending moment equilibrium.

11. The one or more computer-readable storage media of claim 10, wherein computing the structural stress comprises applying an Euler-Bernoulli assumption to the first virtual cross-section.

12. The one or more computer-readable storage media of claim 10, wherein grouping comprises clustering cross-sections that collectively influence the distribution of an external force applied to the three-dimensional model when the three-dimensional model is fixed at a first location.

13. The one or more computer-readable storage media of claim 12, wherein clustering cross-sections comprises:

constructing an adjacency graph representing the connected triangles of the 3D model and a connectivity graph representing the geometric distribution of the cross-sections across the 3D model;

assigning a first cross-section included in a first layer to a first group;

based on the analyzing the adjacency graph in conjunction with the connectivity graph, identifying a second cross-section that is accessible from both sides of plane of the first layer via paths of triangles that do not cross other cross-sections; and adding the second cross-section to the first group.

14. The one or more computer-readable storage media of claim 10, wherein computing the structural stress associated with each virtual cross-section comprises:

selecting a neutral axis based on the plurality of disjoint cross-sections included in the virtual cross-section; and applying bending moment equilibrium to the virtual cross-section in conjunction with the neutral axis.

15. The one or more computer-readable storage media of claim 14, wherein selecting the neutral axis comprises determining an axis that is both perpendicular to the virtual cross-section and passes through the centroid of the plurality of disjoint cross-sections included in the virtual cross-section.

16. The one or more computer-readable storage media of claim 14, wherein selecting the neutral axis comprises identifying a medial axis of the plurality of disjoint cross-sections included in the virtual cross-section.

17. The one or more computer-readable storage media of claim 10, further comprising identifying an accuracy constraint, and wherein slicing the three-dimensional model comprises:

selecting a thickness based on the accuracy constraint; and partitioning the three-dimensional model at intervals of the selected thickness.

18. The one or more computer-readable storage media of claim 10, further comprising:

determining a value corresponding to the computed structural stress associated with the first virtual cross-section;

enhancing an image of the three-dimensional model displayed on a device to reflect the value;

receiving an updated three-dimensional model;

slicing the updated three-dimensional model to produce one or more new layers of two-dimensional cross-sections;

grouping a plurality of disjoint two-dimensional cross sections included in a second layer into a second virtual cross-section based on the connectivity of the updated three-dimensional model;

computing a structural stress associated with the second virtual cross-section based on bending moment equilibrium;

determining a value corresponding to the computed structural stress associated with the second virtual cross-section; and updating the image to reflect the value associated with the second virtual cross-section.

19. A system configured to perform a structural stress analysis for a three-dimensional model of an object, the system comprising:

a processing unit configured to:

slice the three-dimensional model to produce one or more layers of two-dimensional cross-sections, group a plurality of disjoint two-dimensional cross sections included in a first layer into a first virtual cross-section based on a connectivity of the three-dimensional model, and compute a structural stress associated with the first virtual cross-section based on bending moment equilibrium; and a display device coupled to the processing unit and configured to display the three-dimensional model and the structural stress.

20. The system of claim 19, wherein computing the structural stress comprises applying an Euler-Bernoulli assumption to the first virtual cross-section.

* * * * *